May 19, 1970     A. H. WINKLER     3,512,508

INTERNAL COMBUSTION ENGINE CHARGE FORMATION AND INDUCTION SYSTEM

Filed May 8, 1968     2 Sheets-Sheet 1

WITNESS:
Esther M. Stockton

INVENTOR.
Albert H. Winkler
BY

ATTORNEY

United States Patent Office 3,512,508
Patented May 19, 1970

3,512,508
INTERNAL COMBUSTION ENGINE CHARGE
FORMATION AND INDUCTION SYSTEM
Albert H. Winkler, Rushcutter's Bay, New South Wales, Australia, assignor to The Bendix Corporation, Elmira, N.Y., a corporation of Delaware
Filed May 8, 1968, Ser. No. 727,633
Int. Cl. F02m 7/22, 11/02, 23/02
U.S. Cl. 123—119
9 Claims

ABSTRACT OF THE DISCLOSURE

A combined carburetion and manifold system to reduce exhaust emissions without a decrease in engine performance. A metered air/fuel mixture is discharged into the primary intake system of a duo-intake manifold system. The primary passage may be heated through spot contact with the exhaust manifold to prevent fuel condensation and accumulation on the manifold walls. The secondary intake system would supply metered air separately to the combustion cylinders. Accurate fuel metering for total air flow is achieved by air valving means which meters total air flowing into both primary and secondary intake systems.

BRIEF SUMMARY OF THE INVENTION

This invention relates to duo-intake manifold systems and carburetors used in conjunction therewith. The prior art, as best represented by U.S. Pat. 3,338,568, issued to G. A. Mangeletsi, suggests the advantages of using a duo-intake manifold for supplying the air/fuel mixture to an internal combustion engine. The advantages there suggested can be lumped together under the general term "improved low power performance." The essence of the duo-intake manifold system being that as long as a relatively-small volume of the air/fuel mixture is being consumed by the engine, this volume would be supplied by an intake system of smaller cross-sectional area so that the air/fuel mixture flow rate is maintained at a sufficiently-high velocity so that the fuel content of the mixture remains in suspension. When engine speed increases to a sufficiently-elevated value, the secondary intake system opens to supply an additional volume of air/fuel mixture. The secondary intake system usually has a larger cross-sectional area than does the primary intake system, but may also be equal to or smaller than the primary intake system in cross-sectional area.

The system taught by the prior art shows a primary intake system which branches off from the secondary intake system at some point downstream from the carburetor and then returns to the secondary system at some point upstream from the ignition cylinder of the engine. During the low power stage of operation when the secondary system is not in use, air/fuel mixture tends to become trapped within the secondary system and the fuel content thereof has an opportunity to come out of suspension and to condense on the manifold walls. When this intake system is then opened, this condensed fuel may be drawn into the engine, along with a quantity of the air/fuel mixture and cause incomplete combusion, thereby causing an increase in exhaust emissions. Fuel conditioning, which relates to the fuel distribution within the air/fuel mixture itself and also within the manifold, to be proper for any given internal combustion engine, must maintain a certain fuel droplet size and distribution. Fuel condensation can alter both droplet size and distribution which will result in air/fuel mixtures improperly conditioned to give desired burning characteristics. It can also cause uneven operation, since the mixture in the cylinder will not be properly metered. It is, therefore, an object of this invention to provide a properly-conditioned air/fuel mixture to the combustion cylinders of an internal combustion engine. It is an object of this invention to provide a duo-intake manifold system wherein the possibilities of fuel condensation and resultant exhaust emissions are reduced and performance characteristics are improved. It is a still further object of this invention to provide a duo-intake manifold system for internal combustion engines which provides improved fuel conditioning throughout its full range of operation. It is yet another object of the present invention to provide a fuel mixing, conditioning and delivery system which provides increased fuel economy and reduced exhaust emissions.

DETAILED DESCRIPTION

Figure 1:
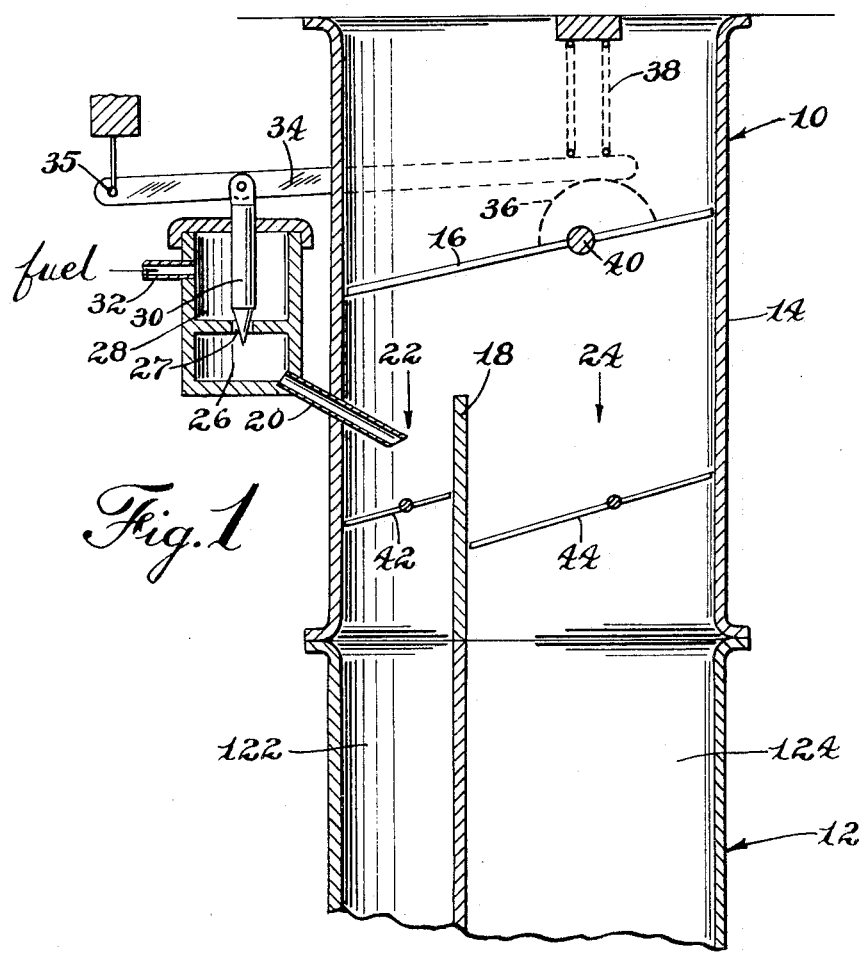
FIG. 1 shows in a schematic cross-section a carburetor adapted for use with the invention and a portion of the manifold associated with the carburetor.

Referring now to FIG. 1, a carburetor, designated generally by 10, is shown. The carburetor 10 is connected to the intake end of a duo-manifold, designated generally by 12, by bolts or other conventional means, not shown. The carburetor has a body 14 and an air responsive valve 16 for directing and measuring the air flow into the manifold 12. Before the flow of air enters the manifold 12, it is separated into plural flows by the divider wall 18. In this instance, there are shown two flow paths designated generally by 22 and 24, but there could easily be more than two as for instance, to accommodate internal combustion engines having large displacements. Downstream of the entry region of flow path 22 is the fuel mixing outlet orifice of fuel conduit 20 which is connected to fuel chamber 26. Chamber 26 is in communication through port 27 with a second fuel chamber 28 with the amount of communication being conntrolled by needle valve 30. The second fuel chamber 28 is supplied by fuel through conduit 32 a source of fuel under pressure, not shown. The position of the needle 30 in the port 27 is controlled by lever arm 34 which pivots about the fulcrum point 35 at its end. The angular relationship of the lever 34, with respect to the needle valve 30, is controlled by the cam surface 36 on the shaft 40 of the air responsive valve 16 and the spring 38. Since the cam surface 36 is shown as asymmetrical about the shaft 40 of the air responsive valve 16, it is readily apparent that, as the valve 16 opens in response to increased air flow through the carburetor 10, the end of the lever 34 in contact with the cam 36 will begin to rise, causing the needle valve 30 to be withdrawn from the port 27, allowing for an increase in fuel flow.

Downstream of the fuel conduit 20 is a throttle valve 42 which is connected through a linkage, not shown, to throttle valve 44 and through further linkage, also not shown, to a throttle control, again not shown. These valves cooperate to allow throttle valve 42 to be nearly wide open before throttle valve 44 begins to open. The linkage interconnecting the throttle includes a lost-motion link to provide progressive operation. The importance of this will become more apparent from the discussion of FIG. 2 below. As can be seen, the flow divider 18 maintains the division of flow up to the duo-manifold 12. The manifold 12 is split into two conduits 122 and 124 which correspond to the flow paths 22 and 24 established in the carburetor 10.

Figure 2:
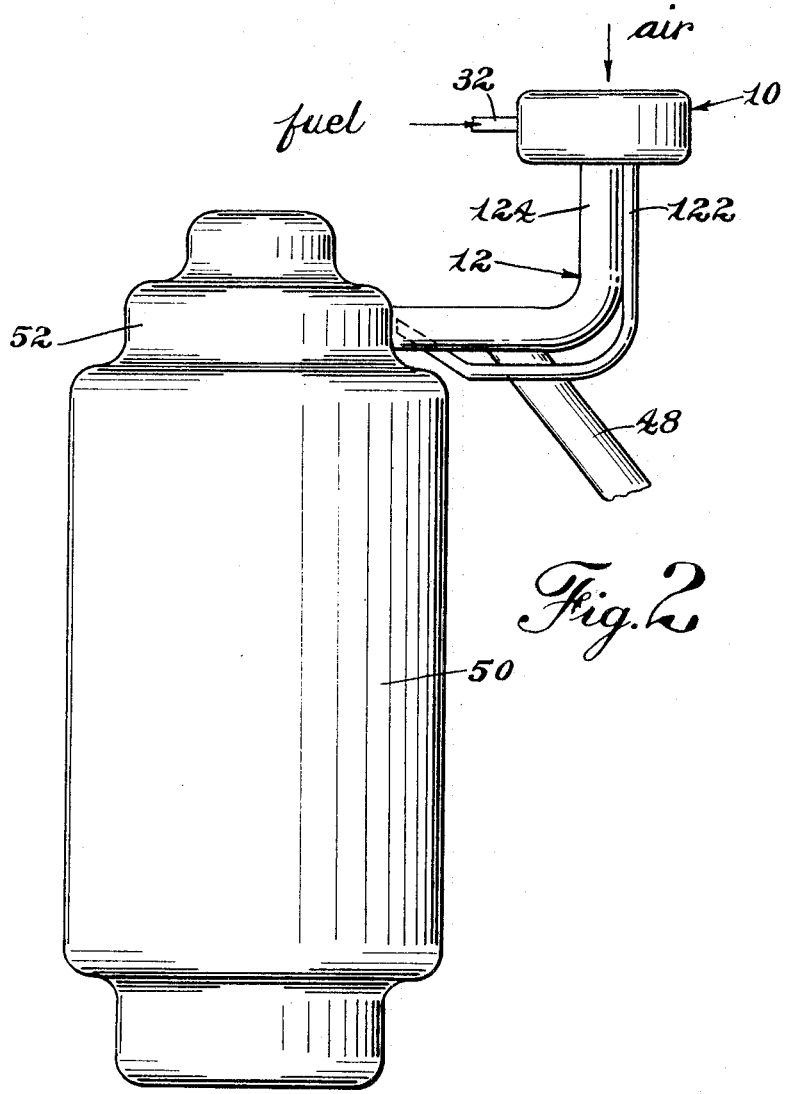
FIG. 2 shows one embodiment of this invention as it might appear in use with a cylinder in-line internal combustion engine.

Referring now to FIG. 2, the duo-manifold 12 is shown schematically in association with an internal combustion engine 50 interconnecting it with the carburetor 10. As can be seen, the conduits 122 and 124 maintain the separated flows up to the engine 50 at which time the primary conduit 122, which contains the air/fuel mixture, passes through a wall of the secondary conduit 124 which has an air only mixture, and primary conduit 122 terminates very close to the cylinder head 52 of the engine 50. Primary conduit 122 is in contact with exhaust manifold 48.

Figure 3:
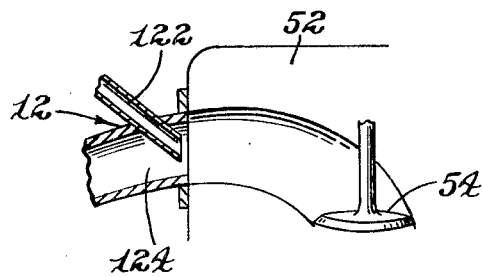
FIG. 3 shows the cylinder block end of the duo-intake manifold, as taught by this invention.

Referring now to FIG. 3, the cylinder head end of the manifold 12 is shown to illustrate more clearly the interrelation of manifold 12 and cylinder intake valve 54. As can be seen, the duality of intake passages or conduits 122 and 124 terminates before the cylinder head 52 where the air/fuel mixture is combined with whatever air is flowing through the secondary conduit 124. This allows for the attainment of the stated objectives without requiring redesigning of the internal combustion engine to accommodate plural intake valves. This location is sufficiently close to the intake valve that the air/fuel mixture will have almost no opportunity to dampen the walls of the secondary conduit 124.

The operation of my invention will be described with reference to FIGS. 1 and 2. The carburetor 10 mixes an air/fuel mixture in flow path 22 which, due to the action of the air responsive valve 16, lever 34, needle valve 30 and fuel chambers 26 and 28, contains an amount of fuel determined to provide optimum combustion with the total volume of air passing around the air valve 16. Throttle valve 42 controls the flow of this mixture and at low or idle speeds, will only be partially open.

Since at low engine speeds the air/fuel requirements for the engine will be low, the throttle valve 44 will be closed. This will restrict air flow to the primary conduit 122 only. Since this conduit 122 has a small cross-sectional area in comparison to the secondary conduit 124, the flow rate will be sufficient to maintain a high flow velocity. This will prevent fuel condensation on the conduit walls and provide for adequate fuel conditioning. To further discourage fuel condensation, the primary conduit may be heated through spot contact with the exhaust manifold 48 or by any other convenient means.

As engine 50 increases its speed of operation in response to opening throttle 42, it will consume increasingly greater quantities of air. As this will increase the air flow through the intake manifold 12, air pressure will force the air responsive valve 16 to move to a position in which these increased quantities of air may enter the carburetor. As the air valve 16 opens, the flow of fuel through fuel conduit 20 will also increase, so that the proper air/fuel mixture is maintained.

At a predetermined point, the throttle valve 44 will also begin to open, allowing air to enter the engine 50 by way of the secondary conduit 124. This conduit 124 will have only air flowing through it, since it is not provided with a source of fuel and the available fuel from conduit 24 is being drawn through the primary conduit 122 by the moving airstream. Again, however, increased air flow, even through the secondary system, will be sensed by the air valve 16 and fuel flow into the primary flow path will increase to maintain the desired air/fuel mixture.

Once the throttle valve 44 begins to open, the flow through conduit 122 will not change very much, except that as the air responsive valve 16 continues to open, additional fuel will pass through the fuel conduit 20. This additional fuel will receive proper conditioning, due to the velocity of air through the primary flow path 22 and the primary conduit 122 and also the agitated mixing action which will be present when the primary conduit 122 exhausts into the secondary conduit 124 at the cylinder head 52.

This purposeful separation of air/fuel conduit 122 from the air only conduit 124 allows an increase in air/fuel flow velocity during low engine speed operation whereas single intake, large cross-section manifolds have such low flow rates that fuel is able to condense and accumulate on the walls of the manifold. This separation also prevents fuel condensation and accumulation on the walls of the lesser-used secondary system 124 during these same low engine speed periods when it is not in use because fuel is never injected into it. Any tendency fuel might have to back flow into the secondary system 124 is negated by the proximity of their juncture to the intake valve of the engine 50.

Under low fuel flows, such as at idle conditions, the high air velocity in the small primary section of the carburetor breaks up the fuel into droplets. The primary section of the manifold being of small cross-sectional area keeps the velocity of the mixture up to prevent "fall out" or puddling in the manifold. Further, with the heat applied to this section and the low volume of mixture, more fuel vaporization of the fuel occurs which better disperses the fuel particles in the air (more homogeneous mixture).

With high fuel flows such as at 50–60 m.p.h., the air velocity in the primary section of the carburetor is also raised which atomizes the fuel better than under lower air flows. The velocity of the mixture in the primary manifold is also greater than at the lower flows. The heat transfer from the manifold to the mixture is less than at low flows, but still helps to further vaporize the fuel.

Preparing the fuel in this way usually allows a much leaner running mixture to be used by the engine without a misfiring condition, thereby reducing the emission levels emitted.

I claim:

1. Apparatus for supplying an internal combustion engine with an air/fuel mixture comprising:
   mixing means operative to mix an air/fuel mixture;
   primary conduit means connected to said mixing means and operative to conduct said air/fuel mixture from said mixing means to said internal combustion engine;
   air responsive valve means operative associated with said mixing means to meter the amount of air being consumed by said internal combustion engine and to supply a first quantity of air to said mixing means;
   fuel supply means connected to said air responsive valve means to vary the quantity of fuel being mixed by said mixing means;
   secondary conduit means operatively associated with said air responsive valve means to conduct a second quantity of air from said air responsive valve means to said internal combustion engine;
   first throttle valve means cooperatively associated with said primary conduit means operative to vary the volume of air/fuel mixture flowing therethrough by variable positioning from a first position to a second position; and
   second throttle valve means cooperatively associated with said secondary conduit means and operative to vary the volume of air flowing therethrough by variable positioning from a first position to a second position.

2. The apparatus claimed in claim 1 including:
   heating means disposed in proximity to said primary conduit means and operative to elevate the temperature thereof.

3. The apparatus claimed in claim 1 wherein said secondary conduit means are substantially larger in cross-sectional area than said primary conduit means.

4. The apparatus claimed in claim 1 wherein the entry region of said secondary conduit means is upstream of the mixing means and downstream of the air responsive valve means.

5. An intake manifold system for an internal combustion engine having mixing means discharging an air/fuel mixture comprising in combination:

air valve means operative to meter the total volume of air being consumed by said internal combustion engine;

air/fuel intake means in cooperative association with said mixing means and said air responsive valve means operative to conduct said air/fuel mixture to said internal combustion engine;

air intake means in cooperative association with said air responsive valve means to supply said internal combustion engine with sufficient additional air to permit complete combustion of said air/fuel mixture;

valve means connected to each of said air/fuel intake means and air intake means operative to control the flow of said air/fuel mixture and said additonal air therethrough; and control means connected to said valve means operative to control said valve means.

6. A carburetor for use with a plural conduit intake manifold device comprising:

air responsive valve means operative to meter total air flow through said carburetor;

air flow dividing means operative to form at least two air flows within said carburetor and to maintain said plural air flows to the outlet and of said carburetor;

fuel introduction means operative to release fuel into at least one but less than all of said plural air flows downstream of said dividing means; and fuel flow metering means operatively associated with said fuel introduction means and with said air responsive valve means to vary fuel flow in direct proportionate response to change in total air flow through said carburetor.

7. The carburetor as claimed in claim 6 including further:

first and second throttle valve means located downstream of said air flow dividing means and operative to control flow through said carburetor.

8. The device as claimed in claim 7 wherein said first throttle valve means are located in each air flow into which fuel has been released and said second throttle valve means are located in the remaining air flows.

9. The device as claimed in claim 8 including throttle valve linkage means operative to open said first throttle valve means a predetermined amount before opening said second throttle valve means.

References Cited

UNITED STATES PATENTS

| | | | |
|---|---|---|---|
| 1,937,938 | 12/1933 | Aseltine et al. | 123—119 |
| 1,960,993 | 5/1934 | Funston et al. | 261—50.1 XR |
| 2,777,678 | 1/1957 | Udale | 261—50.1 XR |
| 3,240,196 | 3/1966 | Ricardo | 123—119 |
| 3,320,938 | 5/1967 | Homfeld et al. | 123—119 XR |
| 3,364,911 | 1/1968 | Baudry et al. | 123—127 |

WENDELL E. BURNS, Primary Examiner

U.S. Cl. X.R.

123—52, 124, 127; 261—63